United States Patent [19]

Spyche, Jr. et al.

[11] Patent Number: 5,507,070

[45] Date of Patent: Apr. 16, 1996

[54] MECHANISM FOR CLOSING A LID

[75] Inventors: Gerald J. Spyche, Jr., West Seneca; David A. Fijas, Cheektowaga, both of N.Y.

[73] Assignee: Enidine, Inc., Orchard Park, N.Y.

[21] Appl. No.: 298,656

[22] Filed: Aug. 31, 1994

[51] Int. Cl.$^6$ ........................................................ E05F 3/00
[52] U.S. Cl. ........................................ 16/49; 16/71; 16/51
[58] Field of Search ................................. 16/49, 51, 57, 16/66, 82, 83, 193, DIG. 9, DIG. 17, DIG. 21; 296/76; 292/DIG. 12, DIG. 15, DIG. 43, 261

[56] References Cited

U.S. PATENT DOCUMENTS

| | | | |
|---|---|---|---|
| 3,765,053 | 10/1973 | Anweiler | 16/49 |
| 4,663,800 | 5/1987 | Mettenleiter et al. | 16/51 |
| 4,973,097 | 11/1990 | Hosan et al. | 296/76 |
| 5,157,806 | 10/1992 | Wartian | 16/66 |

*Primary Examiner*—P. Austin Bradley
*Assistant Examiner*—Chuck Y. Mah
*Attorney, Agent, or Firm*—Harris Beach & Wilcox

[57] ABSTRACT

A mechanism for controlling the opening and closing of a closure object, comprising an outer cylinder whose inner chamber, contains hydraulic fluid, a distal end of the outer cylinder being attachable to either a closure object or an object to be closed. A circumferential single groove is located in an inner wall of the outer cylinder and a piston shaft telescopically received within the outer cylinder extends proximally therefrom, being attachable to either a closure object or an object to be closed, and distally into the inner chamber. A piston head is mounted distally on the piston shaft. The piston head contains a bore therethrough, a peripherally located circumferential retaining groove, and an inclined outer surface which increases in cross section in the distal direction. A seal prevents hydraulic fluid from passing around the piston head between the distal chamber and the proximal chamber. A snap ring, partially housed within the single groove, engages the inclined outer surface of the piston head. A retainer is mounted proximate the distal end of the piston shaft and a valve plate, with an orifice extending therethrough, is slideably mounted on the piston shaft between it and the piston head.

10 Claims, 2 Drawing Sheets

MECHANISM FOR CLOSING A LID

BACKGROUND OF THE INVENTION

1. Field of the Invention

This invention relates to an improved closure mechanism, and more particularly to an improved mechanism for closing a lid, door or the like which prevents the lid from overextending, holds it firmly in a predetermined open position, and controls the rate of closure thereof.

2. Description of the Prior Art

Situations often exist in which a heavy closure object of some sort, such as a lid, a door or the like is required to be retained in at least one fixed open position for some time. In such cases it is also often desired that the lid be easily opened. It is also frequently desirable that the lid close in a controlled manner. This is especially true when the lid closes to a horizontal position—if the lid is heavy, having it fall to a closed position abruptly creates a safety hazard for the person closing it, as well as for bystanders. In addition, having such a heavy object fall precipitously, creates a loud and startling noise. This may be especially undesirable in circumstances where the bystanders may be particularly sensitive to such an occurrence, as will happen in the workplace, for example, or when the falling object is a lid to a casket.

In addition, it is desired that when the lid opens, not only does it do so easily, but also that it only opens to a predetermined position and no further. Thus, it may be undesirable for such a lid to be able to overextend. Particularly if the lid can be rotated past its vertical position, it may fall horizontally open, again causing a hazard. Furthermore such overextension can lead to damage of the supporting structure and perhaps the lid itself.

The problem of controlling the rate of movement of a lid or other heavy object has been addressed in the prior art, particularly in respect to the opening, propping open, and closing of automobile hoods and trunks. However none of the prior art has disclosed the combination of means used in the instant invention to allow easy opening of a lid while preventing overextension thereof, maintaining the lid in a fixed position, and retarding the closing motion of the lid.

Thus for example, U.S. Pat. No. 2,953,810 to Hall describes a door closing device that allows rapid closure of the door to be accomplished by the use of force. Control is achieved through the use of a spring.

U.S. Pat. No. 4,796,871 to Bauer et al. discloses a gas spring with end position dampening. A throttle piston is slideably mounted on the piston rod that is actuated as the piston moves toward the end of the stroke to create a force that opposes the further movement of the piston rod.

U.S. Pat No. 4,178,655 to Little is directed to providing damping at both extremes (the opening and closing of a lid) without retarding the speed of the operation between the two extremes. A spring is used in conjunction with fluid to both provide the force necessary to hold a lid open and to control the rate of movement as it opens and closes.

U.S. Pat. No. 4,323,224 to Freitag et al. involves a gas spring with means for impeding the movement of the piston away from one of the terminal positions. Control is maintained via a valve plate. The piston is maintained in place through the use of two equally pressurized chambers.

SUMMARY OF THE INVENTION

It is therefore a primary object of the present invention to provide a mechanism that, during the opening and closing of a lid, allows the lid to be raised rapidly but retards the rate of its closure.

It is another object of the present invention to provide a mechanism for opening and closing a lid that prevents the lid from overextending.

It is another object of the present invention to provide a mechanism for opening and closing a lid that automatically holds the lid open in a predetermined position.

These and other objects of the present invention are attained by a mechanism for controlling the opening and closing of a closure object comprising an outer cylinder having therein an inner chamber, the inner chamber having contained therein hydraulic fluid, and a distal end of the outer cylinder being attachable to either a closure object or an object to be closed. A circumferential single groove is located in an inner wall of the outer cylinder and a piston shaft is telescopically received within the outer cylinder, extending proximally out of the outer cylinder and is attachable either to a closure object or an object to be closed, and extending distally into the inner chamber. A piston head is mounted distally on the piston shaft, and together with an inner wall of the outer cylinder defines a distal chamber and a proximal chamber. The piston head contains a bore therethrough, a peripherally located circumferential retaining groove, and an inclined outer surface increasing in cross section and having a minimal cross section proximally. A seal prevents hydraulic fluid from passing around the piston head between the distal chamber and the proximal chamber. A snap ring, partially housed within the single groove, engages the inclined outer surface of the piston head. A retainer is mounted proximate the distal end of the piston shaft and a valve plate is slideably mounted on the piston shaft between the retainer and the piston head, the valve plate having an orifice extending therethrough.

BRIEF DESCRIPTION OF THE DRAWINGS

For a better understanding of these and other objects of the present invention, reference is made to the detailed description of the invention, which is to be read in conjunction with the following drawings, wherein.

DETAILED DESCRIPTION OF THE INVENTION

Figure 1:
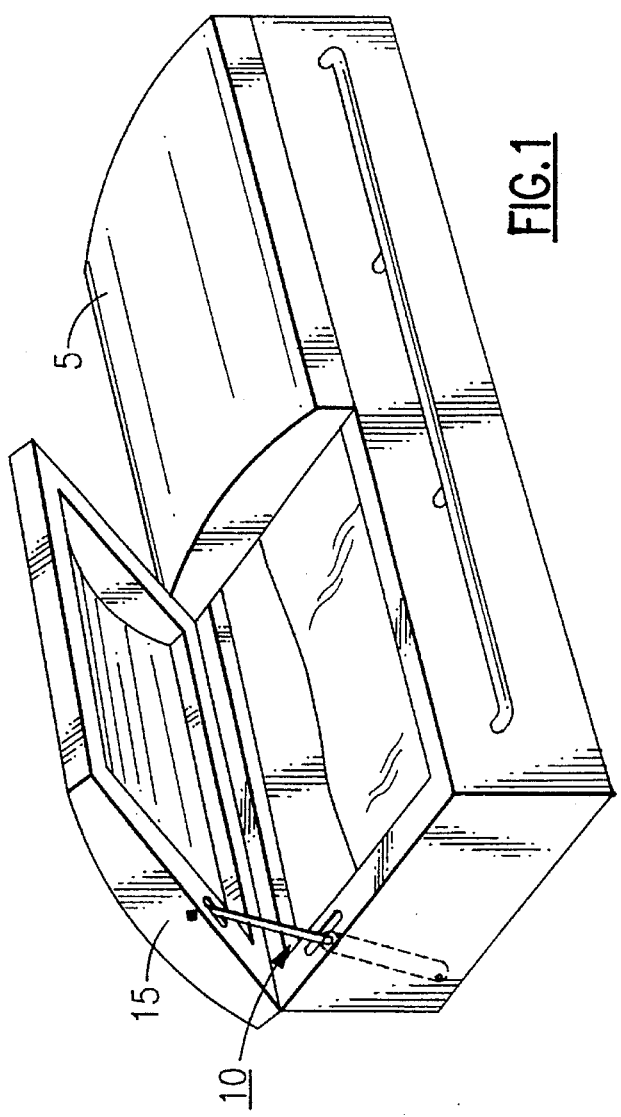
FIG. 1 is a perspective view of a casket with its lid held open by the mechanism of the instant invention.

Turning now to the Drawing and particularly FIG. 1 thereof, a casket 5 having a heavy lid 15 is shown. The lid 15 is normally in one of two positions, those being either closed, or supported in a partially open position. In this case the preferred partially open position is at approximately 80°. The device 10 of the instant invention controls both the opening and closing of the lid 15, as well as to hold it open in the fixed position indicated when the lid 15 is in the partially open position.

Figure 2:
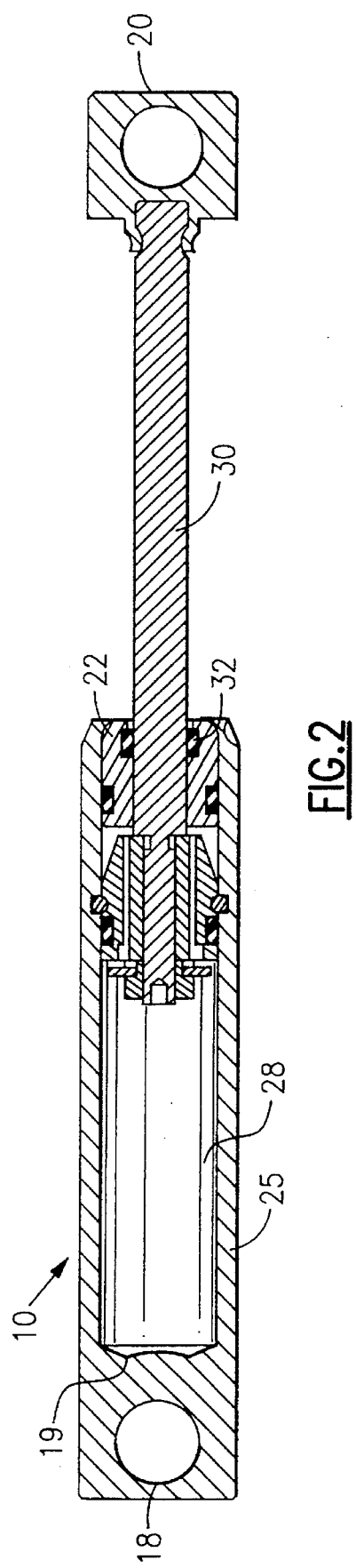
FIG. 2 is a side cross sectional view of the mechanism of the instant invention, in a fully extended position.
Figure 3:
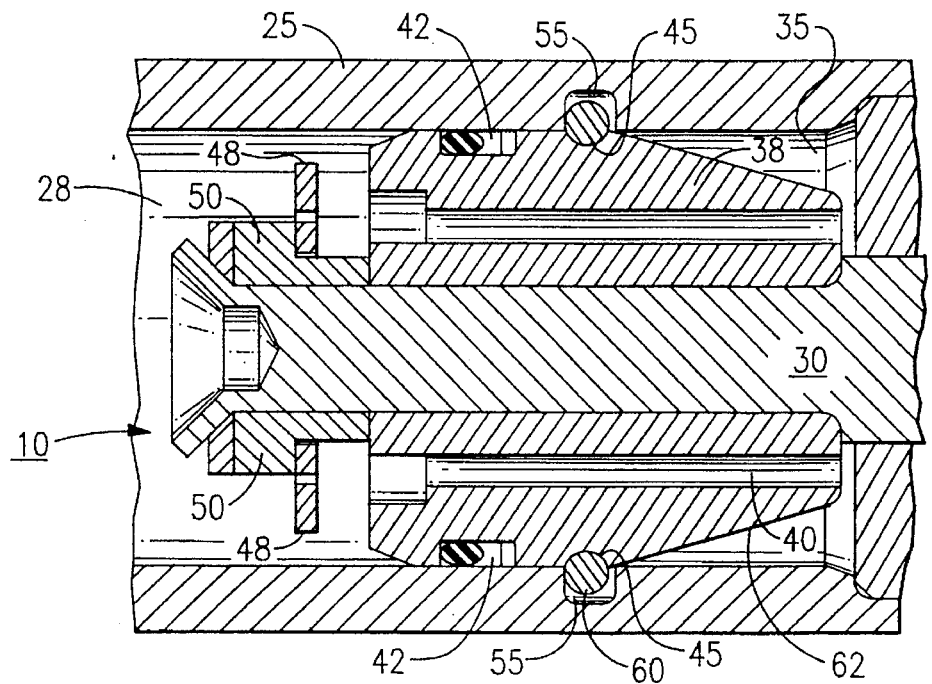
FIG. 3 is a detailed view of the invention of FIG. 2 showing the operative portion of the invention.
Figure 4:
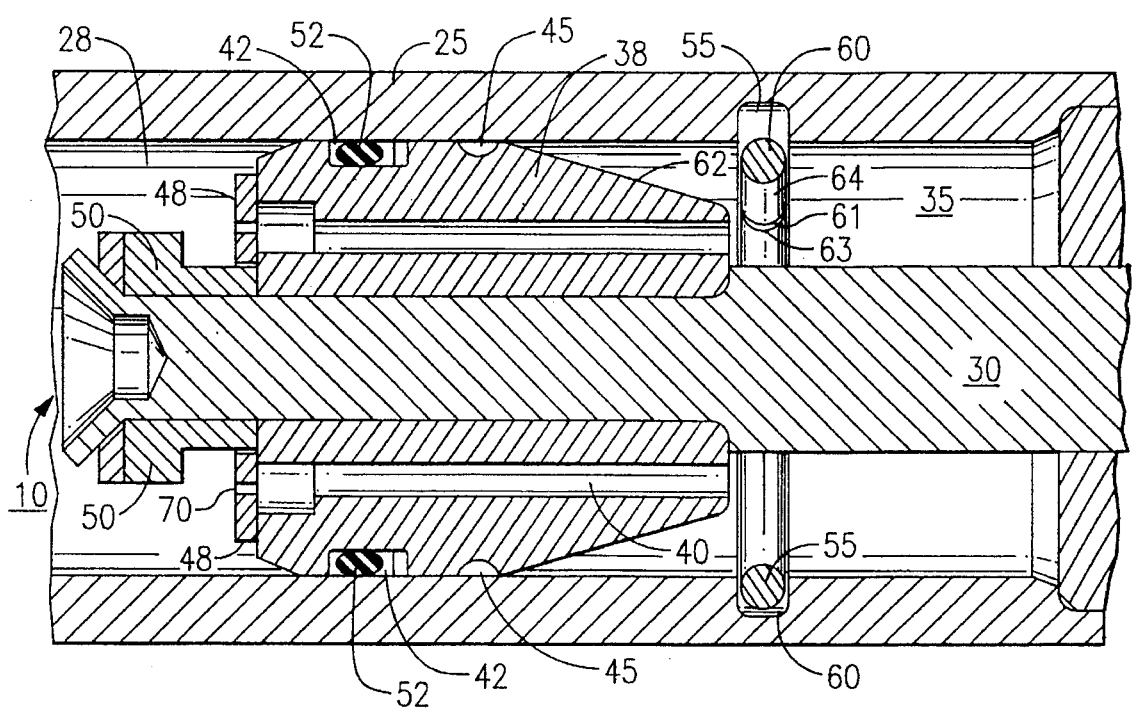
FIG. 4 is a view of the invention of FIG. 3 in a contracted position.

In the preferred embodiment, shown in FIGS. 2–4, the device 10 has a cylindrical body 25 with a coaxial piston shaft 30 extending axially outward of the cylinder through an annular, radial end wall 22 of the cylinder. A gasket 32 or other form of seal prevents leakage of hydraulic fluid. At the distal end the cylinder 25 is imperforate. The device 10 may be mounted between an opening and a closure therefor for example as shown in FIG. 1, a casket 5 and a lid 15, using fastening lugs 18 and 20 on the distal end of cylinder 25 and the proximal end of piston shaft 30 respectively.

The operation of the device 10 can be seen in FIGS. 3 and 4. Attached to the distal end of the piston shaft 30 is a piston head 38. Piston head 38 is sloped outward, having its narrowest circumference proximally and its widest circumference distally located. Through the piston head 38 is an axially oriented bore 40 for passing fluid therethrough from distal chamber 28 to a proximal chamber 35 and back. The distal chamber 28 is bounded by interior walls of the cylinder 25, the distal end 19 of the cylinder interior and the piston head 38, while the proximal chamber 35 is bounded by interior walls of the cylinder 25, the interior of radial end wall 22 and piston head 38.

Piston head 38 contains two circumferential grooves, sealing groove 42 and retaining groove 45. An O-ring 52 is retained inside sealing groove 42 and is held therein by the inner wall of cylinder 25.

A single groove 55 cuts circumferentially through the inner wall of cylinder 28; snap-ring 60 that preferentially contains a single break 61 is retained therein.

Distal to the piston head are found, in order, valve plate 48 and valve retainer 50, valve plate 48 being slideably mounted on the piston shaft 30. Running axially through valve plate 48 is orifice 70, which is narrower in diameter than bore 40.

In operation, then, when lid 15 is drawn upward, piston shaft 30 is also drawn upward, away from the distal end 19 of the chamber interior. This draws the piston head 38 from the distal end 19 of the distal chamber 28 and, in turn, forces fluid from proximal chamber 35 through the bore 40 and into the distal chamber 28. The fluid flow into the distal chamber 28 forces the valve plate 45 away from piston head 38 and against retainer 50. This allows the fluid to pass unobstructed through bore 40, which has a relatively large diameter and, in turn, allows rapid opening of lid 15. During the process fluid flow around the piston head 38 is prevented by the presence of o-ring 52.

Additionally, as the lid 15 is opened, snap ring 60 that is seated in single groove 55 is pushed along the incline 62 of piston head 38. As can be seen, this inclined outer surface of piston head 38 increases in cross section, having its minimal cross section at its proximal end. The snap ring 60 is forced to expand as it is pushed up the incline 62. In the preferred embodiment this is accomplished by the ring being discontinuous; in the opening process then the ends 63 64 of snap ring 60 are moved apart. At the top of the incline 62, the snap ring 60 snaps into retaining groove 45 and is thus captured between retaining groove 45 and single groove 55. The downward compression force of lid 15 on snap ring 60 compresses the snap ring 60 so approximately half the snap ring 60 is retained in retaining groove 45 and half in single groove 55, forming a rigid strut and thus arresting the movement of piston head 38 and piston shaft 30, and locking the lid 15 into place.

In order to close the lid 15, downward pressure must be placed upon it. This has the effect of first forcing the snap ring 60 out of the retaining groove 45 as the piston shaft 30 and piston head 38 move downward toward the distal end 19 of the cylinder 25. Fluid from the distal chamber 28 is forced in a proximal direction toward piston head 38. Because the o-ring 52 prevents fluid from escaping around the piston head 38 into the proximal chamber 35, the fluid is forced through the bore 40.

This movement of fluid from proximal chamber 35 to distal chamber 28 results in valve plate 48 being drawn flush against the piston head 38. The valve plate 48 partially blocks access to bore 40, access being restricted to small diameter orifice 70. The narrowness of orifice 70 results in increased resistance to movement of the piston shaft 30 and piston head 38 which in turn, prevents the lid 15 from rapid closing. It can be seen that the relative and absolute diameters of the bore 40 and orifice 70 control the rates at which the lid 15 can be opened and closed respectively.

While this invention has been explained with reference to the structure disclosed herein, it is not confined to the details set forth and this application is intended to cover any modifications and changes as may come within the scope of the following claims:

What is claimed is:

1. A mechanism for controlling the opening and closing of a closure object comprising:

an outer cylinder having therein an inner chamber, said inner chamber having contained therein hydraulic fluid, and a distal end of said outer cylinder being attachable to one of the group consisting of a closure object and an object to be closed;

a circumferential single groove located in an inner wall of said outer cylinder;

a piston shaft telescopically received within said outer cylinder, said piston shaft extending proximally out of the outer cylinder and attachable to the other one of a group consisting of a closure object and an object to be closed, said piston shaft extending distally into said inner chamber;

a piston head mounted distally on said piston shaft, said piston head and an inner wall of said outer cylinder defining a distal chamber and a proximal chamber, said piston head containing a bore therethrough, a peripherally located circumferential retaining groove, and an inclined outer surface increasing in cross section and having a minimal cross section proximally;

sealing means for preventing hydraulic fluid from passing around said piston head between said distal chamber and said proximal chamber;

a snap ring partially housed within said single groove and being engageable with said inclined outer surface of said piston head;

a retainer mounted proximate the distal end of said piston shaft; and a valve plate, slideably mounted on said piston shaft between said retainer and said piston head, said valve plate having an orifice extending therethrough.

2. The mechanism of claim 1 wherein said snap ring is comprised of a discontinuous ring of metal.

3. The mechanism of claim 1 wherein said sealing means comprises an elastomeric ring.

4. The mechanism of claim 1 wherein said hydraulic fluid is oil.

5. The mechanism of claim 1 wherein said snap ring is set at a position so as to be capable of holding the closure object open at a predetermined angle.

6. The mechanism of claim 1 wherein said distal end of said outer cylinder is attached to an object to be closed and the proximal end of said piston shaft is attached to a closure object.

7. The mechanism of claim 1 wherein said bore is axially oriented in said piston head and said orifice extends axially through said valve plate.

8. The mechanism of claim 1 wherein said sealing means comprises a distally located circumferential sealing groove located on said piston head and a sealing ring fitting circumferentially about said piston head and retained in said sealing groove.

9. The mechanism according to claim 5 wherein said predetermined angle is 80°.

10. A mechanism for controlling the opening and closing of a casket lid on a casket comprising:

- an outer cylinder having therein an inner chamber, said inner chamber having contained therein hydraulic fluid, and a distal end of said outer cylinder being attachable to one of the group consisting of a casket lid and a casket;
- a circumferential single groove located in an inner wall of said outer cylinder;
- a piston shaft telescopically received within said outer cylinder, said piston shaft extending proximally out of the outer cylinder and attachable to the other one of a group consisting of a casket lid and a casket, said piston shaft extending distally into said inner chamber;
- a piston head mounted distally on said piston shaft, said piston head and an inner wall of said outer cylinder defining a distal chamber and a proximal chamber, said piston head containing a bore therethrough, a peripherally located circumferential retaining groove, and an inclined outer surface increasing in cross section and having a minimal cross section proximally;
- sealing means for preventing hydraulic fluid from passing around said piston head between said distal chamber and said proximal chamber;
- a snap ring partially housed within said single groove and being engageable with said inclined outer surface of said piston head;
- a retainer mounted proximate the distal end of said piston shaft; and
- a valve plate, slideably mounted on said piston shaft between said retainer and said piston head, said valve plate having an orifice extending therethrough.

* * * * *